United States Patent [19]

Baer

[11] 3,978,948

[45] Sept. 7, 1976

[54] NEUTRAL-TYPE ELECTROMAGNETIC CLUTCH-BRAKE UNIT

[75] Inventor: John S. Baer, Bar Harbor, Maine

[73] Assignee: Warner Electric Brake & Clutch Company, South Beloit, Ill.

[22] Filed: Apr. 28, 1975

[21] Appl. No.: 572,195

[52] U.S. Cl. .......................... 192/18 B; 188/71.2; 188/164
[51] Int. Cl.² .................................... F16D 67/06
[58] Field of Search ............... 192/18 B; 188/71.2, 188/164

[56] References Cited
UNITED STATES PATENTS

| | | | |
|---|---|---|---|
| 2,692,667 | 10/1954 | Bliedung et al. | 192/18 B X |
| 2,859,845 | 11/1958 | Bachman | 192/18 B X |
| 3,198,302 | 8/1965 | Janzen | 192/18 B X |
| 3,337,013 | 8/1967 | Wrensch | 192/18 B X |
| 3,738,461 | 6/1973 | Brooks et al. | 192/18 B X |
| 3,749,955 | 7/1973 | Fetzer | 310/93 |

FOREIGN PATENTS OR APPLICATIONS 1,166,180   10/1969   United Kingdom

*Primary Examiner*—Benjamin W. Wyche
*Attorney, Agent, or Firm*—Leydig, Voit, Osann, Mayer & Holt, Ltd.

[57] ABSTRACT

The unit includes an electromagnet which may be energized to effect shifting of an armature from a clutching position in which the armature couples driving and driven elements to a braking position in which the armature engages a braking member to produce braking of the driven element. The braking member normally is locked against rotation so as to apply a braking torque to the armature and the driven element but may be selectively unlocked and permitted to rotate so as to enable the armature and the driven element to free-wheel.

3 Claims, 3 Drawing Figures

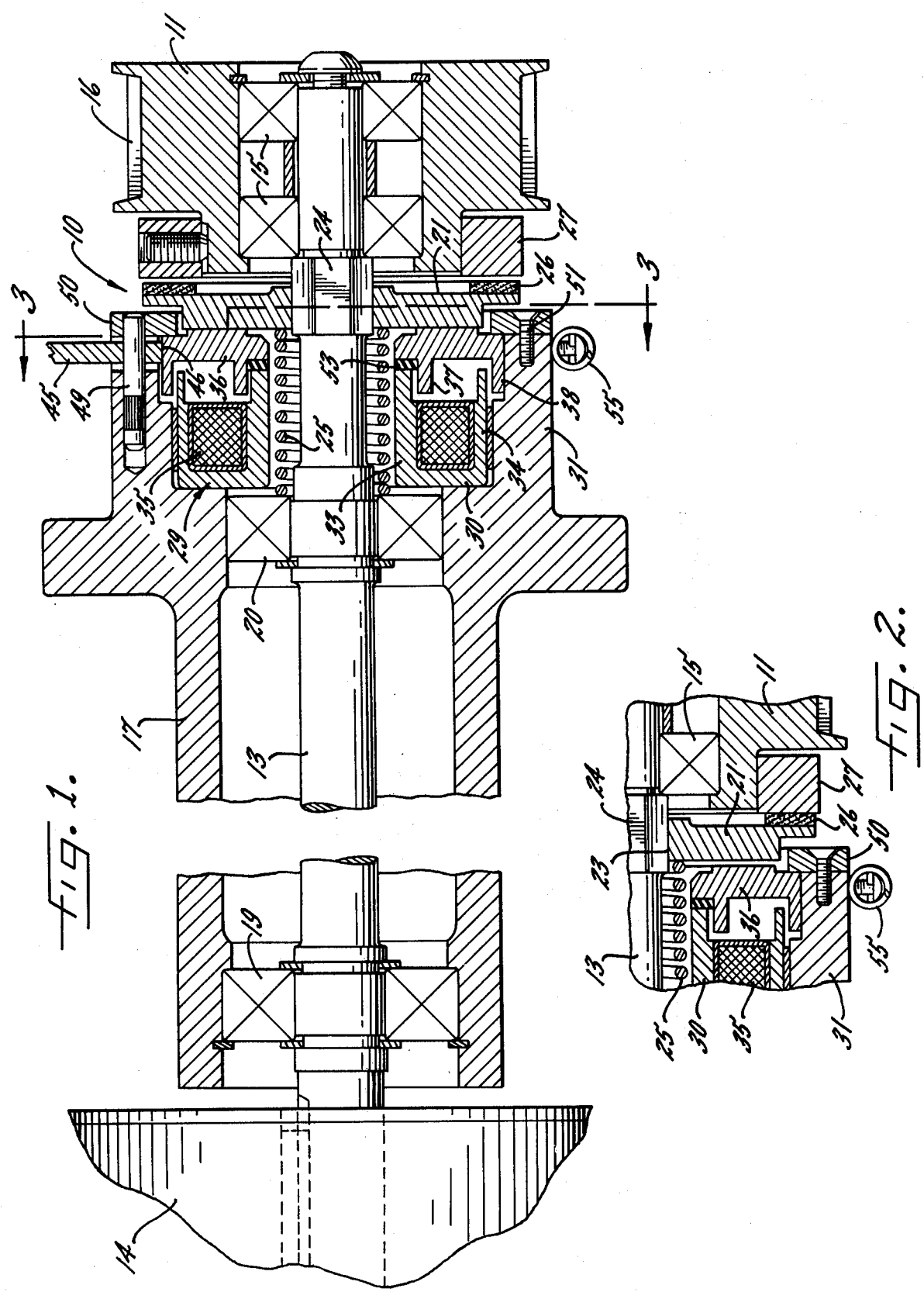

NEUTRAL-TYPE ELECTROMAGNETIC CLUTCH-BRAKE UNIT

BACKGROUND OF THE INVENTION

This invention relates generally to an electromagnetic clutch-brake unit which is selectively operable to either couple a rotatable driven element for rotation in unison with a rotatable driving element or to uncouple the elements and apply a braking force to one of the elements. Units of this general type are disclosed in British Pat. No. 1,166,180 and in U.S. Pat. Nos. 3,738,461 and 3,749,955 and comprise a selectively energizable electomagnetic coil adapted to effect shifting of an armature between clutching and braking positions. The armature is connected to rotate with one of the rotatable elements and, when shifted to its clutching position, the armature couples that element for rotation with the other element. When shifted to its braking position, the armature de-clutches the elements and coacts with a rotationally fixed braking member to effect positive braking of the one element.

The clutch-brake unit disclosed in U.S. Pat. No. 3,738,461 is of the so-called neutral type in that the unit can be operated so as to neither clutch nor brake the one rotatable element. When the unit is so operated, the one element may rotate freely or free-wheel relative to both the unit and the other rotatable element.

SUMMARY OF THE INVENTION

The general aim of the present invention is to provide a new and improved neutral-type electromagnetic clutch-brake unit which is of simpler, lower cost and more compact construction than prior neutral-type units of the same general character.

A more detailed object is to achieve the foregoing through the provision of a clutch-brake unit in which the braking member is rotatably supported but normally is locked against rotation when applying a braking force to the one rotatable element. Free-wheeling of that element may be effected simply by unlocking the braking member to permit the braking member and the connected element to rotate freely.

The invention also resides in the novel mounting of the braking member and in the provision of unique and easily operable means for selectively locking and unlocking the braking member.

These and other objects and advantages of the invention will become more apparent from the following detailed description when taken in conjunction with the accompanying drawings.

BRIEF DESCRIPTION OF THE DRAWINGS

FIG. 1 is a fragmentary cross-section taken longitudinally through a new and improved clutch-brake unit incorporating the novel features of the present invention, the armature of the unit being shown in its braking position.

FIG. 2 is a view of a portion of the unit illustrated in FIG. 1 but shows the armature in its clutching position.

DETAILED DESCRIPTION OF THE PREFERRED EMBODIMENT

Figure 3:
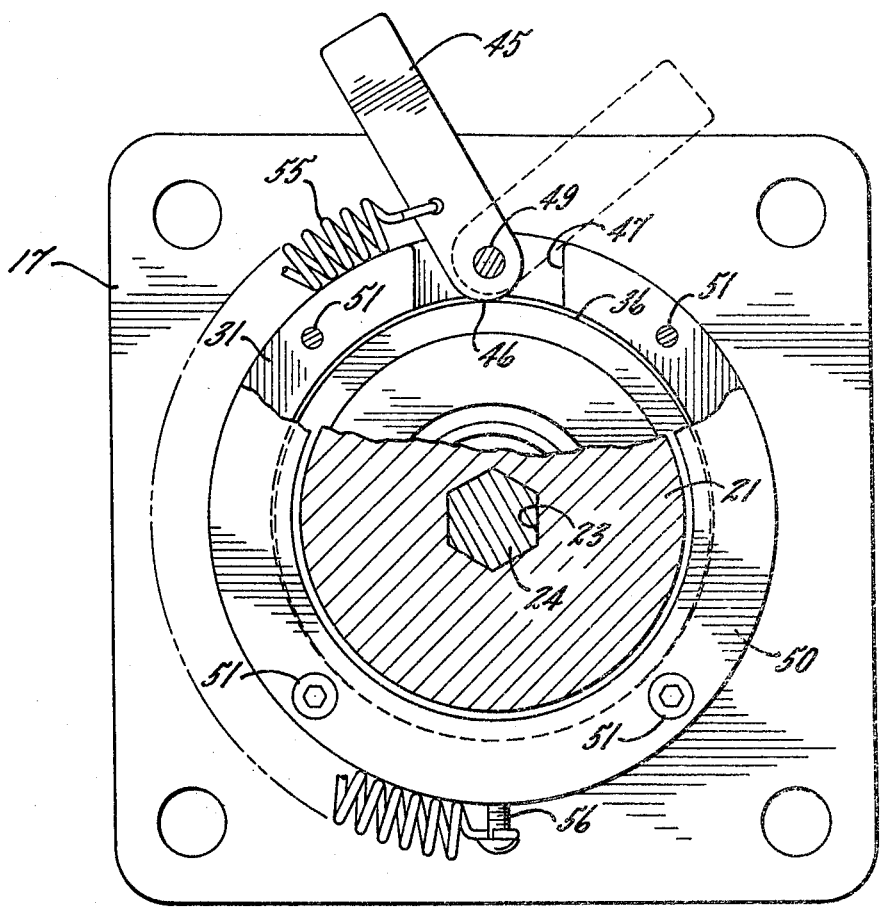
FIG. 3 is an enlarged cross-section taken substantially along the line 3—3 of FIG. 1.

As shown in the drawings for purposes of illustration, the invention is embodied in an electromagnetic clutch-brake unit 10 for selectively coupling a rotatable input or driving element 11 to a rotatable output or driven element 13 or for uncoupling the two elements and applying a braking force to the driven element. In this particular instance, the driven element 13 is a twisting spindle of the type commonly used with textile machines and having an end portion which carries a feed package 14 of thread adapted to be unwound from the package when the spindle is rotated. The driving element 11 is a whorl which is rotatably journaled on the opposite end portion of the spindle 13 by ball bearings 15 and which is rotated continuously by a drive belt (not shown) trained around the whorl and engaging teeth 16 on the periphery thereof.

The clutch-brake unit 10 comprises a main support in the form of a rotationally fixed sleeve 17 through which the spindle 13 extends, there being ball bearings 19 and 20 in the sleeve for rotatably supporting the spindle. Disposed between the whorl 11 and the adjacent end of the sleeve 17 is an armature 21 which serves to couple the whorl releasably to the spindle 13. The armature is formed by a circular disc made of soft iron and includes a hexagonal shaped central opening 23 (FIG. 3) which slidably and non-rotatably receives a similarly shaped enlargement 24 on the spindle. A coil spring 25 is telescoped over the spindle and is compressed between the bearing 20 and the armature 21 to urge the latter to the right along the spindle and toward a clutching position (see FIG. 2). When the armature is in its clutching position, a ring 26 of friction material on the outboard face of the armature engages and clutches against the inboard face of a collar 27 rigid with the inboard end portion of the whorl 11. Accordingly, the armature is rotated by the whorl and rotates the spindle through the hexagonal drive established at 23 and 24.

To uncouple the spindle 13 from the whorl 11 and brake the spindle, the armature 21 is adapted to be shifted to the left to a braking position (FIG. 1). For this purpose, an electromagnet 29 having an annular magnet core 30 is telescoped into and fastened within an enlarged end portion 31 of the sleeve 17. The magnet core is of U-shaped cross-section and includes inner and outer concentric pole pieces 33 and 34 which enclose a multiple turn winding 35 adapted to be selectively energized and de-energized.

Telescoped in the end portion 31 of the sleeve 17 and located between the armature 21 and the magnet core 30 is an annular braking member 36 having inner and outer axially projecting flanges 37 and 38 which are substantially concentric with and spaced outwardly from the pole pieces 33 and 34 of the core. When the winding 35 is energized, magnetic flux threads the air gaps between the magnet core 30 and the braking member 36 and draws the armature 21 to the left to its braking position (FIG. 1) against the bias of the spring 25. When the armature is shifted to its braking position, the friction ring 26 releases the collar 27 on the whorl 11 while the opposite face of the armature engages the outboard face of the braking member 36 thereby to apply a braking torque to the armature and the coupled spindle 13.

During normal operation, the armature 21 is located in its clutching position (FIG. 2) and thus the spindle 13 is positively rotated to feed out thread from the package 14 carried on the spindle. If the thread should break, the winding 35 is energized automatically to shift the armature to its braking position (FIG. 1) and thereby interrupt the drive to the spindle and brake the spindle to a stop. When re-threading the textile machine, the operator must withdraw a length of thread from the package 14 and may accomplish this in a comparatively easy manner if the package and the coupled spindle 13 can be rotated freely in the unwind direction to enable the operator to simply pull the thread from the package. Accordingly, it is desirable to be able to place the clutch-brake unit 10 in a neutral condition in which the spindle 13 is neither coupled to the whorl 11 nor is braked against rotation but instead is capable of free-wheeling.

In accordance with the present invention, free-wheeling capability is incorporated into the electromagnetic clutch-brake unit 10 in a unique manner which enables the unit to be of simpler and more compact construction than prior units of the same general character. To these ends, the braking member 36 is rotatably supported by the fixed sleeve portion 31 but normally is locked against rotation relative to the sleeve so that the braking member normally will apply a braking torque to the armature 21 and the spindle 13 when the armature is in its braking position. The braking member may, however, be selectively unlocked from the sleeve and, while keeping the armature in its braking position, may rotate freely relative to the sleeve to permit free rotation of the spindle.

More specifically, the braking member or rotor 36 is telescoped into the end portion 31 of the sleeve 17 with a very small amount of radial clearance so that the braking rotor may turn within the sleeve. In keeping with the invention, provision is made of manually operable means which normally lock the rotor 36 against rotation within the sleeve but which may be selectively actuated to unlock the rotor so as to permit free rotation of the rotor, the armature 21 and the spindle 13. In this particular instance, these means comprise a lever 45 (FIG. 3) having a semi-circular inner end portion or nose 46. The nose of the lever extends into a slot 47 formed through the end portion 31 of the sleeve 17 and is pivotally mounted on a pin 49 having one end portion pressed into a hole formed in the end portion of the sleeve. The other end portion of the pin is fitted within a hole formed in a ring 50 (FIG. 1) wich is secured to the end portion of the sleeve by screws 51. The ring 50 also serves to captivate the braking rotor 36 against axial movement in one direction along the spindle 13 while axial movement of the braking rotor in the opposite direction is prevented by a thrust washer 53 disposed between the rotor and the inner pole piece 33 of the magnet core 30.

As shown in FIG. 3, the pivot pin 49 extends eccentrically through the nose 46 and thus the latter defines a cam on the inner end of the lever 45. When the lever is disposed in its locking position shown in full lines in FIG. 3, the nose bears against the upper side of the braking rotor 36 and clamps the latter downwardly against the lower side of the end portion 31 of the sleeve 17. Accordingly, the lever and the sleeve coact to lock the rotor against rotation. When the lever 45 is pivoted clockwise to its unlocking position shown in phantom, the nose 46 releases the rotor 36 so as to free the rotor for rotation within the end portion 31 of the sleeve. Normally, the lever is held in its locking position by a contractile spring 55 (FIG. 3) which is stretched around the sleeve and which is anchored between the lever and a screw 56 on the underside of the sleeve.

With the foregoing arrangement, the brake rotor 36 normally is held against rotation by the lever 45. When the winding 35 is energized, the armature 21 is shifted out of coupling engagement with the whorl 11 and is drawn into engagement with the rotor 36. As long as the lever remains in its locking position, the fixed rotor applies a braking torque to the armature so as to retard rotation of the spindle 13. By manually pivoting the lever 45 to its unlocking position, the operator may free the rotor for rotation with the sleeve portion 31 and thereby enable the armature and the spindle 13 to free-wheel so long as the winding remains energized to keep the armature in engagement with the rotor and out of engagement with the whorl. When the operator releases the lever, the spring 55 automatically returns the lever to its locking position so that the nose 46 of the lever will once again clamp against and hold the rotor.

From the foregoing, it will be apparent that the present invention brings to the art a new and improved neutral-type electromagnetic clutch-brake unit 10 which requires only a single electromagnet 29 and thus is of relatively simple and compact construction. While the lever 45 has been described as being actuated manually, those familiar with the art will appreciate that the lever could be actuated by a small solenoid or other power operator. Also, the lever 45 which has been shown is only one exemplary way of selectively locking the rotor 36 and it will be appreciated that different locking means can be employed.

I claim:

1. A clutch-brake unit operable selectively to either (a) couple a rotatable driving element to a rotatable driven element, (b) uncouple the elements and brake one of the elements, or (c) uncouple the elements and allow free-wheeling of said one element, said unit comprising a rotatably fixed support, a brake member mounted for rotation relative to said support, means on said support and selectively engageable with said brake member in every angular position of the brake member and operable when so engaged to frictionally hold said brake member against rotation relative to said support regardless of the angular position of the brake member, an armature rotatable with said one element and movable between clutching and braking positions, said armature being disposed out of braking engagement with said brake member and being disposed in clutching engagement with the other of said elements when said armature is in said clutching position whereby said armature couples said elements for rotation in unison, said armature being disposed out of clutching engagement with the other of said elements and being disposed in braking engagement with said brake member when said armature is in said braking position whereby said armature uncouples said elements and coacts with said brake member to brake said one element so long as said brake member is held against rotation relative to said support, selectively operable electromagnetic means on said support for causing said armature to move between said clutching and braking positions, and said holding means being selectively operable, when said armature is braking engagement with said brake member, to release said brake member from said support and permit said brake member and said armature to rotate in unison relative to said support thereby to enable said one element to free-wheel when said armature is in engagement with said brake member and said brake member is released.

2. A clutch-brake unit as defined in claim 1 in which said selectively engageable holding means comprise means mounted on said support and adapted to be moved into and out of clamping engagement with said braking member.

3. A clutch-brake unit as defined in claim 2 further including means for normally keeping said selectively engageable holding means in clamping engagement with said braking member.

* * * * *